United States Patent
Lin

(10) Patent No.: US 7,266,670 B2
(45) Date of Patent: Sep. 4, 2007

(54) METHOD OF DETERMINING WHETHER A VIRTUAL ADDRESS CORRESPONDS TO A PHYSICAL ADDRESS IN A TRANSLATION LOOKASIDE BUFFER

(75) Inventor: Akan Lin, Kao-Hsiung (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 370 days.

(21) Appl. No.: 10/709,893

(22) Filed: Jun. 4, 2004

(65) Prior Publication Data
US 2005/0273574 A1    Dec. 8, 2005

(51) Int. Cl.
*G06F 12/00*    (2006.01)
(52) U.S. Cl. .................. 711/207; 711/205; 711/221; 711/118
(58) Field of Classification Search ............ 711/207, 711/204, 208, 203, 202, 206, 118, 205, 221
See application file for complete search history.

(56) References Cited

U.S. PATENT DOCUMENTS

| | | | | |
|---|---|---|---|---|
| 4,595,923 | A * | 6/1986 | McFarland, Jr. | 340/825.52 |
| 6,012,106 | A * | 1/2000 | Schumann et al. | 711/221 |
| 6,047,354 | A * | 4/2000 | Yoshioka et al. | 711/118 |
| 6,393,544 | B1 * | 5/2002 | Bryg et al. | 711/220 |
| 6,625,715 | B1 * | 9/2003 | Mathews | 711/207 |
| 6,715,057 | B1 * | 3/2004 | Kessler et al. | 711/207 |
| 6,957,315 | B2 * | 10/2005 | Chauvel | 711/207 |
| 7,100,018 | B2 * | 8/2006 | Zhang et al. | 711/207 |
| 2003/0023814 | A1 * | 1/2003 | Barroso et al. | 711/122 |

* cited by examiner

*Primary Examiner*—Pierre-Michel Bataille
(74) *Attorney, Agent, or Firm*—Winston Hsu

(57) ABSTRACT

A method of determining whether a virtual address corresponds to a physical address in a translation lookaside buffer (TLB) includes receiving a virtual address, setting the page type of the virtual address according to a rank of the page types, picking index bits and tag compared address from the virtual address and comparing the index bits and the tag compared bits with the page types and the tag addresses in TLB. After these addresses and bits match, the page types are ranked according to the compared results.

10 Claims, 5 Drawing Sheets

METHOD OF DETERMINING WHETHER A VIRTUAL ADDRESS CORRESPONDS TO A PHYSICAL ADDRESS IN A TRANSLATION LOOKASIDE BUFFER

BACKGROUND OF INVENTION

1. Field of the Invention

The present invention relates to a method of determining whether a virtual address corresponds to a physical address in a translation lookaside buffer.

2. Description of the Prior Art

Memory has become an essential device in computer systems. How to access data stored in memory efficiently and quickly is an important problem that concerns those skilled in the art. When a CPU accesses data stored in the memory, it must send a memory address for pointing out what part of the memory stores the data that is to be accessed. It seems that the memory is assumed to be composed of a plurality of memory units which have their own addresses. These addresses in the memory are called physical addresses. However, when the CPU of a normal computer accesses the memory, the CPU sends the virtual address instead of physical address for representing the address of the memory where the data is stored. The virtual address is translated into the physical address through a specific method, which is accomplished by a translation lookaside buffer (TLB). Translating the virtual address into the physical address for accessing the memory can make the memory in the computer system more elastic and more efficient.

The translation lookaside buffer can be regarded as a big comparing table. One side of the comparing table comprises the virtual addresses of the CPU, the other side of the comparing table comprises the physical addresses, and the translation lookaside buffer determines the corresponding relationship between the physical addresses and the virtual addresses. When the CPU accesses the data of a specific address of a memory, the CPU first compares the specific address with the virtual addresses in the comparing table, and then finds out the corresponding physical address for accessing the data. The translation lookaside buffer is usually set up in a cache memory for quickly mapping. The mapping method of the translation lookaside buffer is shown in FIG. 1, which is a diagram of a mapping method of a translation lookaside buffer with various page sizes according to the prior art. The method can be divided into three parts. The first part is "comparing bits", the second part is "decoding bits", and the third part is referred to as "Page". The mapping method of the translation lookaside buffer utilizes a page as a unit instead of a single memory. A page is composed of a series of memories, and the addresses of the memories in the same page have the same leading bits. The comparing bits can be regarded as the page number of different pages. The decoding bits are the index of a certain related entry. In the procedure of comparing, the decoding bits are first utilized for finding out the entries of the corresponding relationships stored in the translation lookaside buffer and determining an entry, and then the comparing bits are utilized for comparing and finding out the page number so that the corresponding page is determined. The translation lookaside buffer only has to handle the comparing bits and decoding bits, and the memories of the page can be appropriately executed through the direct accessing method.

However, for a translation lookaside buffer which has various page sizes, the page sizes are not fixed. For example, the page sizes can be 1 k bits, 4 k bits, 64 k bits, 1M bits, or the like. In FIG. 1, a 32-bit translation lookaside buffer and the distribution of the bits in the translation lookaside buffer with four different page sizes are shown. A page of a 1 k-bit page size has 10 bits that are respectively from the $0^{th}$ bit to the $9^{th}$ bit. If the corresponding relationship that is to be determined by the decoding bits has 64 different entries, 4 bits are needed so that from the $12^{th}$ bit to the $15^{th}$ bit are the decoding bits. The 18 bits left are therefore comparing bits. Besides, the page of a 64 k-bit page size has 16 bits that are respectively from the $0^{th}$ bit to the $15^{th}$ bit. The decoding bits are from the $16^{th}$ bit to $19^{th}$ bit, and the comparing bits are from the $20^{th}$ bit to $31^{st}$ bit. Other sizes may be deduced by analogy.

Please refer to FIG. 2, which is a block diagram of the translation lookaside buffer 10 according to the prior art. The translation lookaside buffer 10 comprises four related memory blocks 12, four data memory blocks 14, and a multiplexer 16. The decoding bits and the comparing bits of the virtual address are inputted into the related memory blocks 12. The comparing bits are compared with a memory content selected by the decoding bits in the related memory blocks 12, and then the comparing results are inputted into the multiplexer 16. At the same time, the decoding bits also selects the physical address in the data memory blocks 14 that corresponds to the virtual address and outputs the results into the multiplexer 16.

Although the prior art translation lookaside buffer can efficiently complete the mapping between the virtual addresses and the physical addresses, the hardware equipment is complicated and the cost is high because of the method of parallel processing for comparing bits of different entries. Furthermore, a memory with many ports is needed to implement the above-mentioned structure so that the complexity of the design is higher. And then, when the prior art compares different page sizes, each page capacity needs a translation lookaside buffer shown in FIG. 2. This means that four page sizes need four translation lookaside buffers. Apparently, for the translation lookaside buffer used for different page sizes, the prior art hardware required is increased in a direct proportion so that the hardware can not be efficiently utilized for completing the translation between the virtual address and the physical address.

SUMMARY OF INVENTION

It is therefore a primary objective of the claimed invention to provide a method for determining whether a virtual address corresponds to a physical address in a translation lookaside buffer to solve the above-mentioned problem. The virtual address is composed of a plurality of bits, and the translation lookaside buffer (TLB) comprises a plurality of tag addresses and page types, and the physical addresses correspond to each tag address. The method comprises (a) receiving the virtual address, (b) setting the page type of the virtual address according to the rank of the page types, (c) picking index bits and tag compared address from the virtual address, (d) comparing the page type of the virtual address in step (b) and the tag compared address in step (c) with the page types and the tag addresses in TLB, and (e) if the page type of the virtual address in step (b) and the tag compared bits in step (c) are equal to a page type and tag addresses in TLB, determining the ranks of the page types.

These and other objectives of the present invention will no doubt obvious to those of ordinary skill in the art after reading the following detailed description of the preferred embodiment that is illustrated in the various figures and drawings.

DETAILED DESCRIPTION

Figure 1:
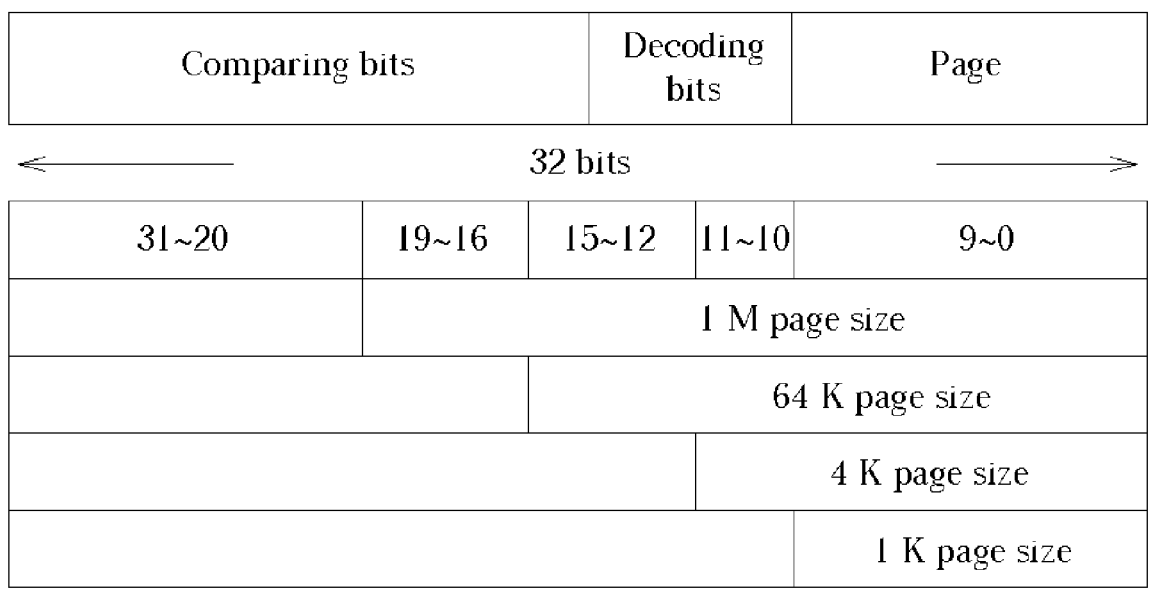
FIG. 1 is a diagram of a mapping method of a translation lookaside buffer with various page sizes according to the prior art.
Figure 2:
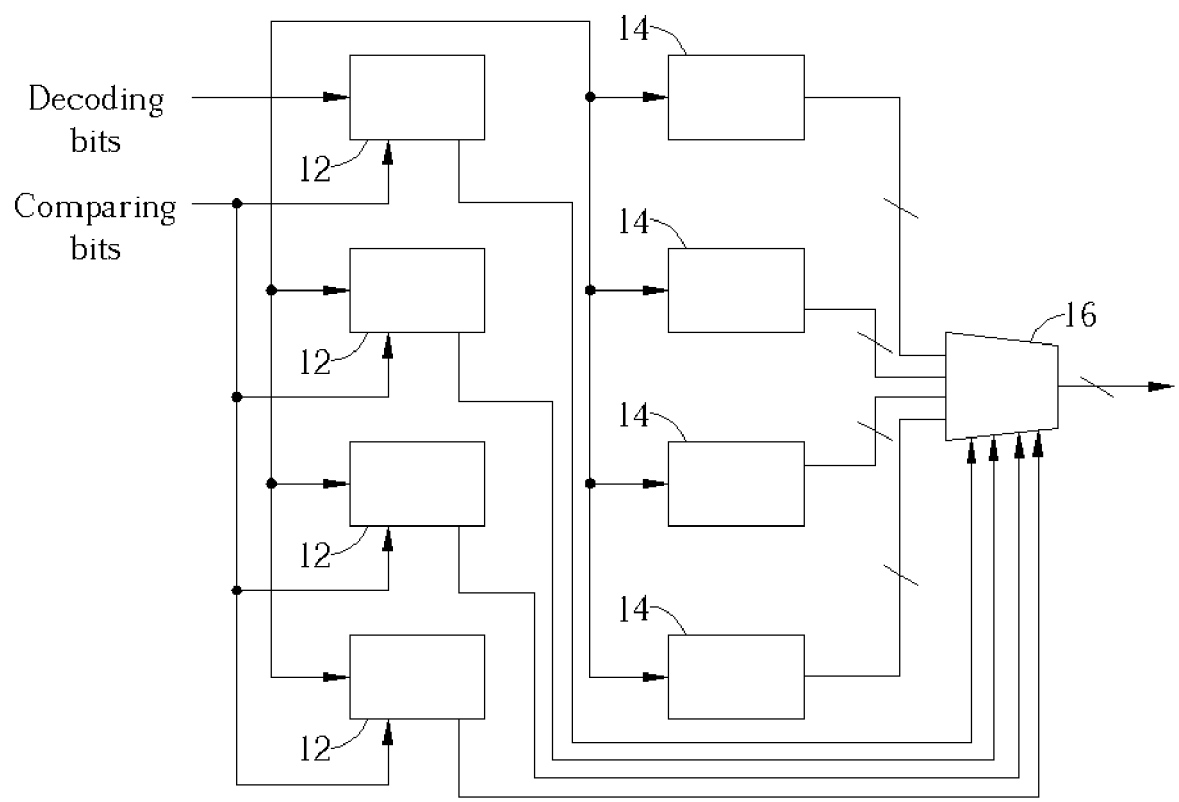
FIG. 2 is a block diagram of the translation lookaside buffer according to the prior art.
Figure 3:
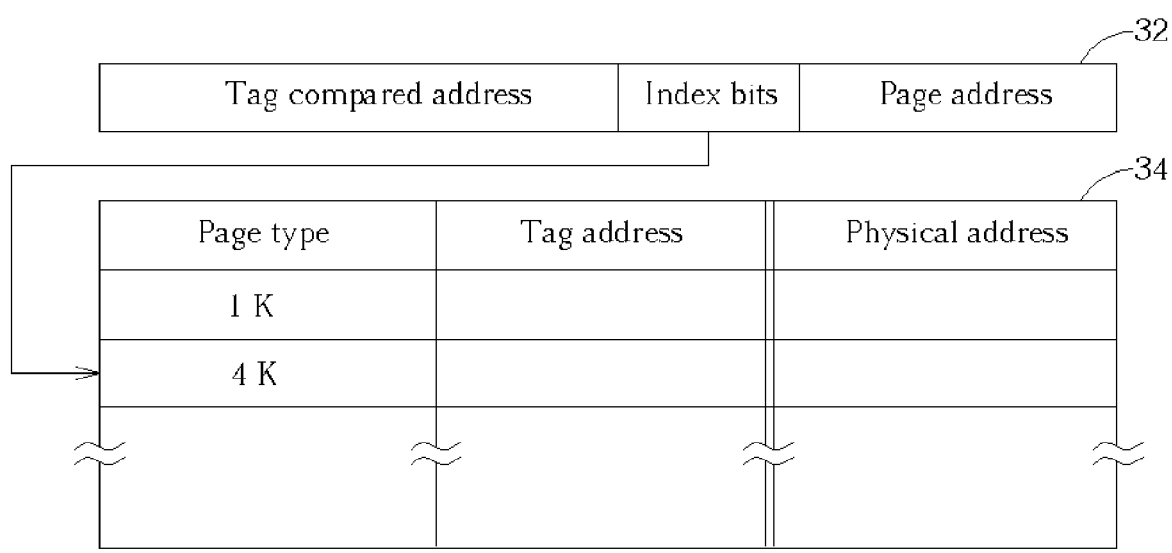
FIG. 3 is a diagram of a virtual address and a translation lookaside buffer according to the present invention.

Please refer to FIG. 3, which is a diagram of a virtual address 32 and a TLB (translation lookaside buffer) 34 according to the present invention. The virtual address 32 comprises a tag compared address, index bits, and a page address. The translation lookaside buffer 34 comprises a plurality of page types, a plurality of tag addresses, and a plurality of physical addresses. The page types, tag addresses, and virtual addresses of the translation lookaside buffer 34 have fixed corresponding relationships. A page address is a series of bits, and has different page sizes according to different page types. Page types are used for expressing the different page sizes of page addresses. For example, the page sizes can be 1 kb(b stands for bit), 4 kb, 16 kb, 1 Mb, etc. The index bits are composed of several bits and are used for searching the data in the translation lookaside buffer corresponding to the virtual address. In this embodiment, the index bits are several leading bits in the page address, for example, a page address with 1 k page capacity is from $0^{th}$ bit to $9^{th}$ bit in the virtual address; and if the TLB 34 has 16 entries, the index bits are 4 bits and are from $10^{th}$ bit to $13^{th}$ bit; and the other bits that are from $14^{th}$ bit to $31^{st}$ bit are tag compared address bits.

In the embodiment, when comparing the virtual address 32 with the TLB 34, we first determine what bits in the virtual address are the index bits according to the defined page type in the virtual address, and then we find the tag address in the TLB 34 according to the index bits. We compare the tag compared address with the tag address, and if the tag compared address corresponds to the tag address, then we determine whether the page type in the TLB 34 corresponds to the defined page type in the virtual address. If the page type in the TLB 34 corresponds to the defined page type in the virtual address, a physical address in the TLB 34 corresponding to the virtual address 32 is found.

Figure 4:
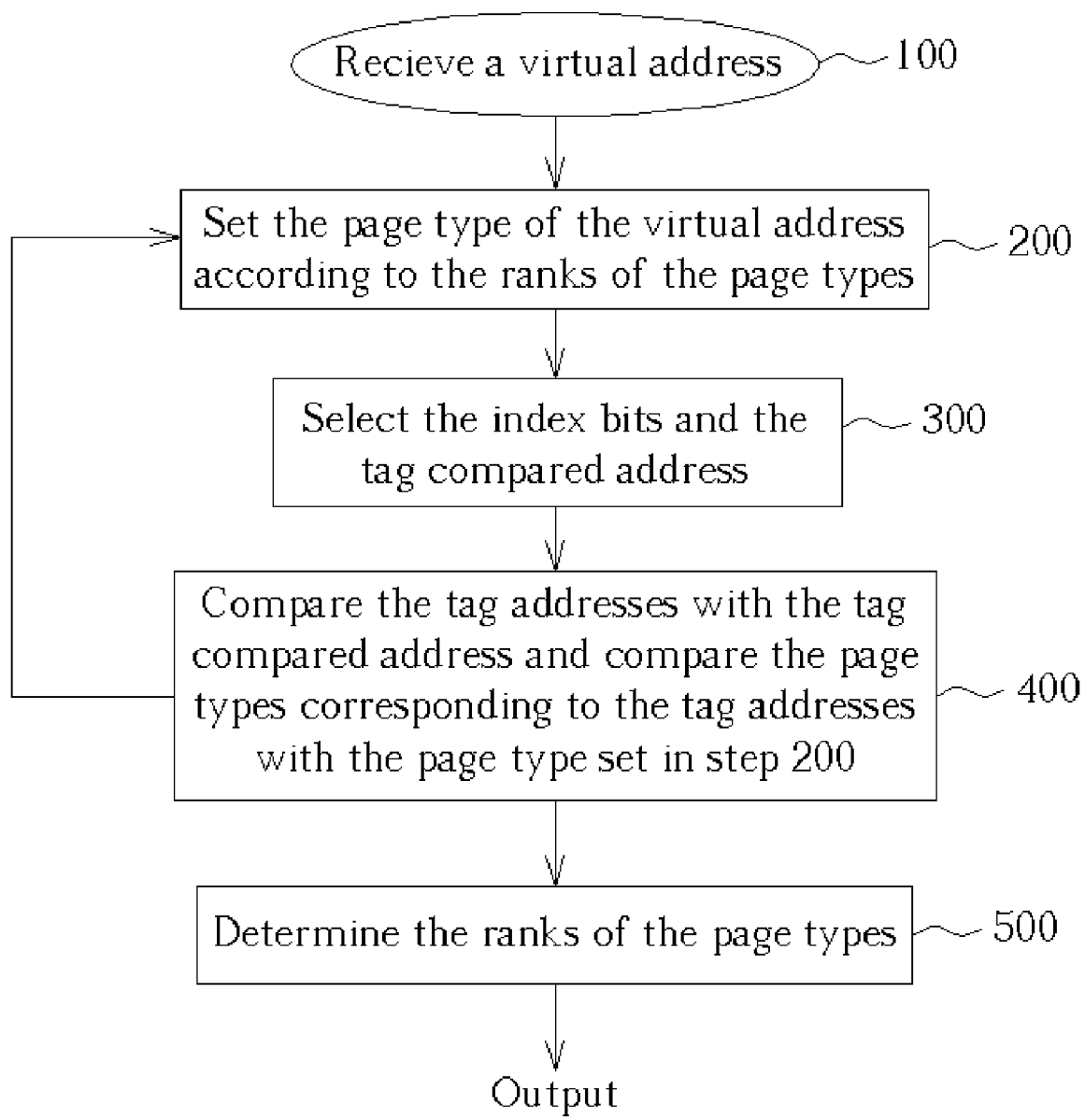
FIG. 4 is a flow chart of determining whether a virtual address corresponds to a physical address in a translation lookaside buffer according to the present invention.

Please refer to FIG. 4, which is a flow chart of determining whether a virtual address corresponds to a physical address in a translation lookaside buffer according to the present invention. An important aspect according to the present invention is to determine virtual addresses with different page types and to determine the ranks of the page types so that the determining procedure can be more efficient. In step 100, we receive a virtual address. But in fact, when receiving the virtual address, we do not know what page type the virtual address belongs to. So, in step 200, we set the page type of the virtual address according to the ranks of the page types, which correspond to how frequently the virtual addresses belonging to the page types can find corresponding physical addresses in the TLB. At first, we assume that the page type of the virtual address with the highest rank is correct. Please note that in step 200, although we assume the page type of the virtual address according to the ranks of the page types, the page type we assumed would be incorrect. If the page type is incorrect, we have to assume another page type of the virtual address again and the other page type of the virtual address can not be the same as the first page type we assumed. So we assume that the page type of the virtual address with the second highest rank is correct. But if the page type is not correct, we have to assume the page type according to the ranks of the page types again, and so on.

After setting the page type, we can know how many bits the page address has. So, the index bits and the tag compared address are defined. In step 300, we select the index bits and the tag compared address according to the page type of the virtual address. In step 400, we find a plurality of tag addresses in the TLB 34 according to the index bits and compare one by one the plurality of tag addresses with the tag compared address we selected in step 300. Furthermore, we check one by one whether the page types corresponding to the plurality of tag addresses are equal to the page type we set in step 200. If we find an entry whose tag address and the page type in the TLB 34 respectively correspond to the tag compared address and the page type of the virtual address, we determine that the physical address of the entry in the TLB 34 corresponds to the virtual address. Please note that if the tag address or the page type of an entry does not correspond, the entry is invalid, but if either the tag address or the page type of an entry does not correspond, the entry is valid so that the virtual address can correspond to the physical address of the entry. And then in step 500, the computer system can smoothly access the data in a memory according to the physical address.

Failures of comparing may be due to the following conditions. In the first condition, the page type we set in step 200 is incorrect so that the page type in the TLB 34 does not correspond to the page type of virtual address. In this situation, we have to return to step 200 for resetting the page type according to the ranks of the page types for comparing. Please note that the incorrect page type con not be set for the same virtual address again. Steps 200 to 400 repeat until an entry is found to be valid. If all page types are tried and no entry is found to be valid, it represents the second condition, which is the virtual address that we receive does not correspond to any entry of the TLB. In another words, the virtual address does not correspond to any physical address in the TLB.

After a successfully comparison, the ranks of page types are determined in step 500. Three embodiments according to the present invention are provided for setting the ranks of page types. In the first embodiment, we first rank all the page types in a beginning order. After receiving the virtual address and comparing the virtual address with the TLB successfully, the rank of the page type of the virtual is raised to a higher rank. But if the rank of the page type is already the highest, the rank is not moved. For example, the ranks of all page types are respectively 1 k, 4 k, 16 k, and 64 k. If now we receive the virtual address, comparing the virtual address with the TLB successfully, and the page type of the virtual address is 16 k, the rank of page type 16k is raised to a higher rank so that the ranks of the page types become 1 k, 16 k, 4 k, and 64 k. And if next time the page type of the virtual address is 1 k and the comparing operation of the page type 1 k is completed and successful, the rank of the page type 1 k should be raised, but the rank of page type 1 k is already the highest so that the ranks of the page types are the same 1K, 16K, 4K, and 64K.

In the second embodiment, the ranks of the page types are set according the number of times of page type that is compared successfully. The method is illustrated as follows:

(i) calculate the number of times of page types that are compared successfully (ii) rank the page types according to the number of times of page types that are compared successfully where the bigger the number is, the higher the rank is.

Here, if two or more than two page types are compared successfully the same number of times, the ranks of these page types can be arranged in any order. For example, if the number of times of page type 1 k is 12, the number of times of page type 4 k is 15, the number of times of page type 16 k is 9, and the number of times of page type 64 k is 12, the ranks of the page types can be either 4 k, 1 k, 64 k, and 16 k or 4 k, 64 k, 1 k, and 16 k.

In the third embodiment, a 2-bit counter is utilized for setting the ranks of the page types. The ranking method of the 2-bit counter is known by those skilled in the art and is thus omitted here. These above-mentioned ranking methods are only for the preferred embodiments, and other methods can also be used for ranking the page types.

Figure 5:
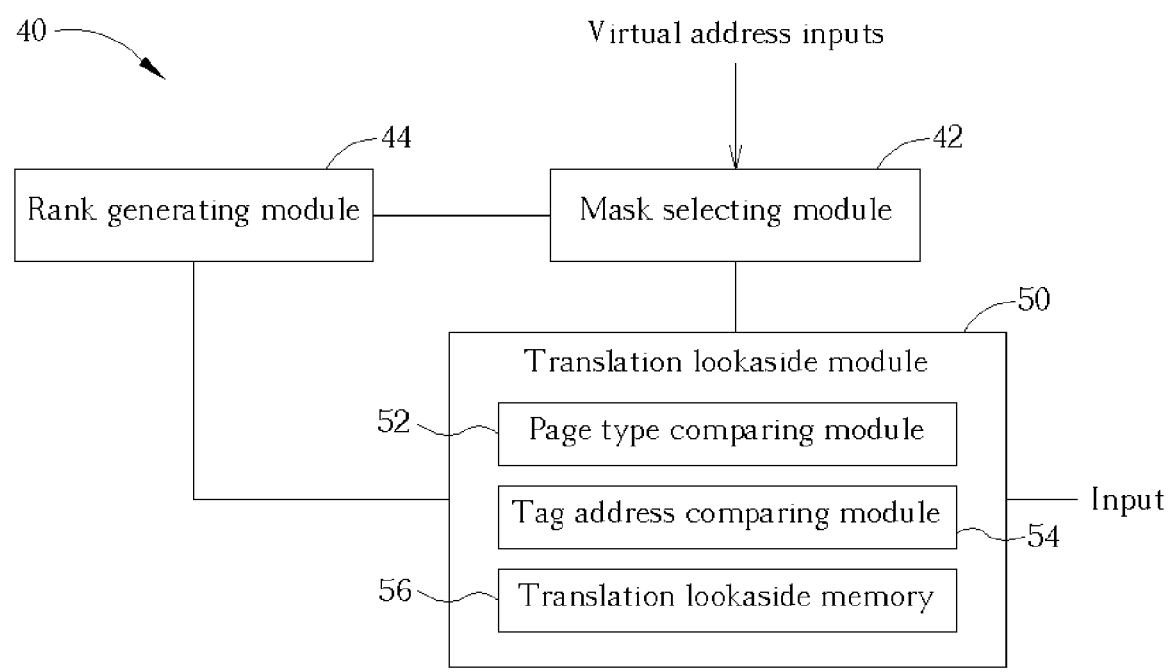
FIG. 5 is a block diagram of a determining device for determining whether a virtual address corresponds to a physical address in a translation lookaside buffer according to the present invention.

Please refer to FIG. 5, which is a block diagram of a determining device 40 for determining whether a virtual address corresponds to a physical address in a translation lookaside buffer according to the present invention. The determining device 40 comprises a mask selecting module 42, a translation lookaside module 50, and a rank generating module 44. The translation lookaside module 50 further comprises a page type comparing module 52, a tag address comparing module 54, and a translation lookaside memory 56. The mask selecting module 42 receives an input of a virtual address and utilizes a mask for selecting parts of bits of the virtual address as the output. In the embodiment, the mask selecting module can mask the page address and the index bits of the virtual address for selecting the tag compared address as the output, or the mask selecting module can mask the page address and the tag compared address of the virtual address for selecting the index bits as the output. The mask selecting module outputs the index bits to the translation lookaside module 50 as the index of the translation lookaside memory 56. In addition, the mask selecting module 42 also outputs a page type signal to the translation lookaside module 50 for page type comparing module 52 to execute the comparing operation.

The translation lookaside memory 56 can be regarded as hardware where the above-mentioned TLB is stored. The translation lookaside memory 56 stores a plurality of tag addresses, a plurality of page types, and a plurality of physical addresses. The tag address comparing module 54 is utilized to compare the tag compared address outputted by the mask selecting module 42 with the tag addresses of the translation lookaside memory 56. The page type comparing module 52 is utilized to compare the page type signal outputted by the mask selecting module 42 with page types of the translation lookaside memory 56. When the tag address comparing module 54 and the page type comparing module 52 both check the virtual address and the TLB successfully, the translation comparing module 50 sends an output signal of "comparing operation success" and a related signal to the rank generating module 44. The rank generating module 44 is utilized to generate the ranks of the plurality of page types in the translation lookaside memory according to the comparing results of the page types. The method of generating the ranks can be performed according to different algorithms. In the preferred embodiment of the present invention, the rank generating module 44 sets the ranks of the page types in step 500. The rank generating module 44 is electrically connected to the mask selecting module 42. The ranks of page types generated by the rank generating module are provided for the mask selecting module 42 to output a page type signal and parts of bits according to the ranks of page types.

The determining device 40 can transfer data from one module to another module through the way of parallel transmission or serial transmission. Generally speaking, the way of parallel transmission needs double the amount of hardware, but the speed of parallel transmission is faster. In the preferred embodiment of the present invention, the way of serial transmission is utilized to transfer data. In the situation of many sorts of page types, the hardware does not need to increase. The determining device 40 of the present invention only needs memories with one port. Besides, because of the rank generating module 44, the number of comparing times and the comparing time are saved, and the operation efficiency is as good as the prior art translation lookaside buffer.

Although the prior art method can complete the mapping of virtual addresses with different page types to physical addresses, the hardware is more complicated and the cost is more because of the way parallel processing is utilized for hardware to compare bits of different entries. Besides, the structure needs memories with many ports so that the complexity of design is higher. Furthermore, as virtual addresses with more and more page sizes are received in the prior art, more and more hardware is used so that the cost is higher. Compared with the prior art, the method of determining whether a virtual address corresponds to a physical address in a TLB according to the present invention utilizes a step of ranking the page types and setting a virtual address of an unknown page type according to the number of times of successful comparisons for reducing the comparing time. In addition, in the determining device for determining whether a virtual address corresponds to a physical address in the TLB, serial transmission is utilized to transfer data so that the complexity of hardware and the cost are reduced and only memories with one port are needed. In conclusion, the present invention has the advantages of low cost and high efficiency.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of determining whether a virtual address corresponds to a physical address in a translation lookaside buffer (TLB), the virtual address comprising a plurality of bits, the translation lookaside buffer (TLB) comprising a plurality of tag addresses and page types, and the physical addresses corresponding to each tag address, the method comprising:

(a) receiving the virtual address;

(b) setting the page type of the virtual address according to the rank of the page types;

(c) fetching index bits and a tag compared address from the page type;

(d) comparing the page type of the virtual address in step (b) and the tag compared address in step (c) with the page types and the tag addresses in the TLB; and (e) adjusting the rank of the page type if the page type of the virtual address in step (b) and the tag compared bits in step (c) correspond with a page type and a tag address in the TLB.

2. The method of claim 1 further comprising searching for a page type in the TLB corresponding to the set page type of the virtual address and an index address for comparing the page type with the tag compared address according to the index bits of the virtual address.

3. The method of claim 1 wherein adjusting the rank of the page type in step (e) comprises raising the rank of the page type of the virtual address if the page type of the virtual address set in step (b) corresponds with a page type in the TLB, if the tag compared address in step (c) corresponds with the tag address in the TLB, and if the rank of the page type of the virtual address in step (b) is not the highest.

4. The method of claim 3 wherein the rank of the page type of the virtual address is raised by one level if the page type of the virtual address set in step (b) corresponds with a page type in the TLB, if the tag compared address in step (c) corresponds with the tag address in the TLB, and if the rank of the page type of the virtual address in step (b) is not the highest.

5. The method of claim 1 wherein adjusting the rank of the page type in step (e) comprises following steps:
   (i) calculating a number of times in which the set page type of the virtual address in step (b) corresponds with a page type in the TLB; and
   (ii) raising the rank of the page type according to the calculated number.

6. The method of claim 1 wherein adjusting the rank of page type in step (e) utilizes a sorting method of a 2-bit counter.

7. The method of claim 1 wherein setting the page type of the virtual address according to the rank of the page type in step (b) comprises setting the page type of the virtual address to be a page type with higher rank.

8. A determining device for determining whether a virtual address corresponds to a physical address in a TLB, comprising:
   a mask selecting module used for receiving the virtual address and outputting a part of the bits of the virtual address and a page type signal according to a rank of a page type;
   a translation lookaside module comprising:
      a TLB used for storing a plurality of index addresses and a plurality of page types;
      a tag address comparing module used for checking whether the part of bits outputted by the mask selecting module corresponds with an index stored in the TLB; and
      a page type comparing module used for checking whether the page type signal outputted by the mask selecting module corresponds with a page type stored in the TLB; and
   a rank generating module used for generating the ranks of the plurality of the page types in the TLB according to the checking result of the page type comparing module.

9. The determining device of claim 8 wherein the rank generating module sets the ranks of the page types in the TLB according to the number of times the page type signal corresponds to the one of the page types in the TLB.

10. The determining device of claim 8 wherein the rank generating module is used for raising the rank of the page types in the TLB if the page type signal corresponds to the one of the page types in the TLB and if the corresponding rank of the page type is not the highest.

\* \* \* \* \*